United States Patent [19]

Berry et al.

[11] Patent Number: 4,739,317

[45] Date of Patent: Apr. 19, 1988

[54] DRAW GRAPHICS CAPABILITIES

[75] Inventors: Richard E. Berry, Georgetown; Thomas M. Ruiz, Austin, both of Tex.

[73] Assignee: International Business Machines Corporation, Armonk, N.Y.

[21] Appl. No.: 595,160

[22] Filed: Mar. 30, 1984

[51] Int. Cl.[4] .............................................. G09G 1/16
[52] U.S. Cl. ................................... 340/723; 340/706; 340/747
[58] Field of Search ............... 340/723, 706, 707, 709; 364/488, 489, 520, 521, 515, 518

[56] References Cited

U.S. PATENT DOCUMENTS

| | | | |
|---|---|---|---|
| 4,318,096 | 3/1982 | Thornburg et al. | 340/707 X |
| 4,371,893 | 2/1983 | Rabeisen | 340/707 X |
| 4,430,526 | 2/1984 | Brown et al. | 340/707 X |

FOREIGN PATENT DOCUMENTS 2325110  4/1977  France .

OTHER PUBLICATIONS

"The Lisa Computer System", Gregg Williams, Feb. 1983, Byte Publishures Inc. pp. 33–50.
Computer Technology Review, vol. 3, No. 1, Jan. 1983, pp. 103–104, 106, 110–111, Los Angeles, CA, US; A. L. Klosterman et al., "Geometric Modeling Speeds Design of Mechanical Assemblies".
Proceedings of the International Conference on Computer Graphic, London, Oct. 1981, pp. 281–292, U. Weissflog, "Graphic Interactive Application Monitor (GIAM)".
IBM Technical Disclosure Bulletin, vol. 25, No. 5, Oct. 1982, pp. 2648–2652, New York, US; G. M. Koppelman et al., "Procedure for Algebraic Transforms of CADS Shape Descriptions".

Primary Examiner—Marshall M. Curtis
Attorney, Agent, or Firm—J. H. Barksdale; C. L. Whitham

[57] ABSTRACT

A method of, and apparatus for, altering the configuration of an art form based on defining a portion of the border of the art form. The definition of the portion is used to call an appropriate routine for permitting operator alteration of the portion. The portion is defined both geometrically and by makeup. Consider a square. If part of the definition includes one side, and another part of the definition is that the side is a solid line, urging the side away from the center of the square will create a rectangle. If part of the definition includes a broken line rather than a solid line, urging the line away from the center will result in a peaked side with the square becoming a polygon. Next consider a circle. If the border portion defined is a solid line semicircle, urging the semicircle away from the center of the circle will result in a shape similar to that of a silhouette of cylinder having domed ends. If the semicircle were defined as a broken line and urged away from the center, the defined semicircle would be changed to an eliptical form.

10 Claims, 3 Drawing Sheets

ARC EXAMPLE

ARC EXAMPLE

DRAW GRAPHICS CAPABILITIES

DESCRIPTION

1. Technical Field

This invention relates generally to computer draw graphics capabilities, and more specifically to dynamic art form alteration.

2. Background Art

In the prior art are various computer assisted design (CAD) systems providing a wide range of draw graphics capabilities. These systems can be under mouse, joy stick, keyboard, scratch pad, track ball, light pen, etc. device control for building and altering art forms on a display screen. With each though, excessive device manipulation and user attention are required. These requirements are time consuming and tedious.

During building or altering an art form on a screen, many changes are often made to a portion or portions of the border of the art form. These changes are generally freehanded with hand manipulated devices such as mice, light pens, and joy sticks. This is because of the ease of use of these devices. The major drawbacks in freehand drawing are not in the actual act of drawing a line or lines, but instead in both operator erasure of lines berng replaced and obtaining a professional appearing configuration. Take a circle. A number of alternatives are available for drawing a circle. One can rummage around for a template, or can freehand the circle and then load and use a smoothing algorithm or routine (application program). If the circle is to then be enlarged, another routine (sizing) must be called. However, operator knowledge of and about these routines is required.

If there is to then be a bulge or bubble placed on the top portion of the circle, freehand drawing capabilities can be taken advantage of. This leaves a number of problems which must be handled. Erasure of the portion of the circle being replaced is required. Also, the bulge must be defined, and a smoothing algorithm called to provide a professional appearance. If the end result is too small a bulge, a start over is required.

For art forms, such as circles which are frequently needed in enlarged or diminished size, it is preferable in the first instance to store the art forms in a symbol table. These art forms can then be called and made of desired size with little difficulty as illustrated in U.S. Pat. No. 4,622,641. If only a portion of the circle is to be edited, operator erasure is readily facilitated according to U.S. Pat. No. 4,672,575.

In utilizing the methods of the above referred to patent applications, creating a circular bulge on another circle requires calling a first circle from a symbol table, sizing the first circle to the desired diameter, calling a second circle from the symbol table, trial and error positioning and sizing the second circle with respect to the first circle, and then erasing undesired portions of both circles. Although somewhat flexible, the tedium and time involved remain excessive. This is particularly the case when compared to the invention of the instant application wherein the portion of the circle to be edited is defined, a pointing cursor is fetched, and a routine is called to edit the circle upon cursor motion based on the definition.

In the prior art is also a windowing system, LI-SA ™, marketed by Apple Computer Inc. For this system, a mouse controlled cursor can be utilized to change the size of windows having square or rectangular shapes. Involved are selecting a portion of a window and then selecting a screen border located sizing icon. The result is that two adjacent sides of the window are moved to the extent of the selected icon. Operator erasure is not necessary, but flexibility is severly restricted and other operator manipulations are excessive.

Also in the prior art are shaping routines. An example is an eliptical routine. A portion of a circle can be defined, and the eliptical routine loaded for changing the portion into an eliptical shape. Definition is fairly simple in that only the extremities of the portion are defined. The loading of the routine, although also fairly simple, is time consuming. Time can be reduced somewhat by storing the routine in mass storage, but the routine must still be operator called. As the number of needed and different routines increases, problems abound. One of the major problems is that the operator must remember which routines are available for use.

The above is prior art primarily in a background sense, and as such, falls short of either anticipating the instant invention or rendering the instant invention obvious. More specifically, the instant invention presents advances over any known prior art systems or methods in that graphic art form editing chores are simplified and rendered dynamic, and precision is readily attained. Also, specific routine names and other identifying data need not be recalled by an operator. Calling is automatic under system control based on an operator definition of the portion of the art form to be altered. The advantages of these advances are improved flexibility and ease of use.

DISCLOSURE OF THE INVENTION

A unique method of, and system for, editing the appearance or configuration of a graphic art form are provided in order to eliminate excessive operator manipulation and attention, improve throughput, expand capabilities, and facilitate rapid change. A number of art form altering routines is stored. The routines will correspond to permitted definitions. Based on a definition of a portion of an art form to be altered, an appropriate routine is called from storage. The routine is then utilized under device control to dynamically attain a desired alteration.

BEST MODE FOR CARRYING OUT THE INVENTION

General Description and Definitions

Art form editing is facilitated by permitting a portion of an art form to be altered to be operator defined, and then causing system alterations to be made to the portion based on the definition. By art form is meant any symbol, alpha/numeric character, representation, etc., displayable on a monitor or display device of a device controlled standalone or input/output terminal computing installation having draw graphics capabilities. Draw graphics capabilities are generally provided by a hardware adapter card and an application program. Instances do occur where these capabilities are provided by both utility and application programs utilized in conjunction with appropriate hardware.

By editing or altering is meant the changing of the shape, appearance, and/or configuration of the displayed art form based on the type of alteration desired to a portion of the art form. The type of alteration is determined based on whether the portion is to be moved or extended. For example, moving one side of a square will cause a rectangle to be formed. Extending a semicircle can cause a portion of an elipse to be formed. Of course, any final configuration will be determined by the variety and selection of stored and/or selected altering routines.

In defining a portion, both that part of the configuration which is to be altered and the type of the portion are specified. In specifying the type of portion, either a straight or curved line can be specified. Straight and curved lines are further definable into solid and broken lines. The part of the configuration which is to be altered is also defined by the outer extremities of the portion.

By algorithm or routine is meant an application program usable by the computing installation for altering the art form based on the definition of the portion of the art form to be altered. The algorithm or routines contemplated for use herein are well known and readily available, and only form part of the combination of this invention. Device control includes control of a monitor by a keyboard, joy stick, light pen, mouse, scratch pad, etc., or any combination of such devices. By system control is meant hardware and/or software control of a programmed or programmable computer installation.

Finally, the display of art forms to be altered according to this invention can be generated using any number of well known techniques. Again, this invention relates to altering a displayed art form.

DETAILED DESCRIPTION

Figure 1:
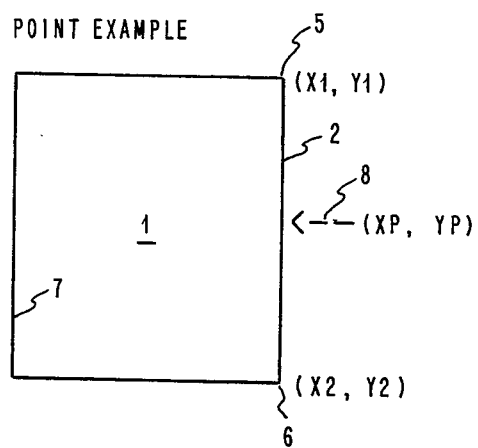
FIG. 1 illustrates a square having a selected side which is to be altered according to this invention.

For a more detailed understanding of the invention reference is first made to FIG. 1. In this figure is shown a square generally denoted by reference numeral 1 and which it is to be assumed is being displayed on an all points addressable monitor under mouse and keyboard device control. It is also to be assumed that a pointer such as pointing cursor 8 is callable and positionable upon the monitor screen relative to the square. The square could initially have been called from a symbol table and made of the size shown through the use of a sizing algorithm.

Figure 2:
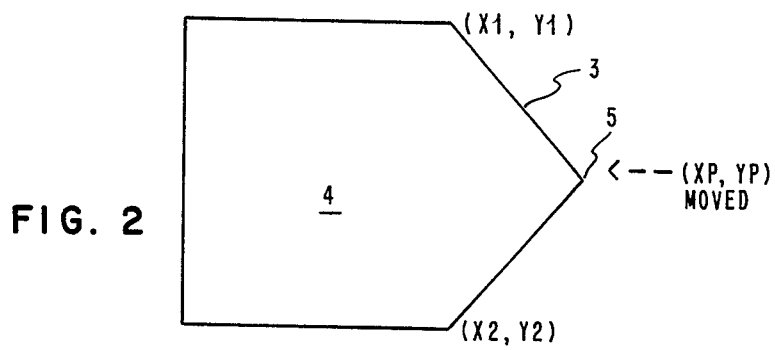
FIG. 2 illustrates a polygon formed upon alteration of the selected side of the square shown in FIG. 1 and based on one definition of the side.

With the square 1 displayed as shown, it is to be assumed that an operator desires to change the right hand side 2 from a vertical line into a peaked side 3 as shown in FIG. 2 to form a polygon 4. Operator procedure for accomplishing this task is first to define side 2. The first part of the definition process is to establish the outer extremities of side 2. This can be accomplished by keying in the X1, Y1, X2, and Y2 coordinates, or by sequentially positioning the pointing cursor 8 at the top and bottom right hand corners 5 and 6, respectively, and depressing a button on the mouse. If the cursor 8 is used, determination and storage of the coordinates will be under system control. The operations described thus far in defining side 2 are well known and will within the skill and capabilities of average programmers and systems today.

The second part of the definition process is to define the type of side 2. Definition here is also in two parts. The first is to define the character of side 2. Here, side 2 is a straight line. The second part of the definition process here is to define side 2 as a broken line. The word "broken" is merely a label. Any other convenient choice of a word or words such as dotted line would suffice as long as the system is structured to understand or interpret the operator's desires.

Based on the above definition, a rubber band type routine is called. Then, if pointing cursor 8 is positioned against, or coincident with, the middle of side 2, the mouse button is pushed, and the cursor then moved to the right, a peaked side will be dynamically formed with the apex 5 positioned as shown in FIG. 2, or at any other desired point. If the pointing cursor 8 were positioned as shown in FIG. 1 and then moved to the left during mouse button depression, an apex could be positioned interior of square 1, or even to the left of the left side 7 of the square. The extent of movement of cursor 8 under mouse control will determine the positioning of apex 5. A point to note is that the direction of point of cursor 8 is immaterial.

The rubber band referred to above is merely descriptive. If a stretched rubber band were substituted for side 2 and anchored at corners 5 and 6, and a pointed object were positioned on the left hand side of side 2 and then urged to the right, the same configuration as shown in FIG. 2 could be attained. Another point is that although cursor 8 is positioned midway along side 2, cursor 8 could be positioned anywhere along side 2. The ultimate configuration would be determined by available routines or routine capabilities.

Of importance is that the configuration can be changed dynamically and to any extent, up to screen limitations in the absence of scrolling capabilities, upon cursor motion and with no old lines to be separately or later erased. Also of importance is that only a defined portion of an art form is affected. This offers far greater draw graphics capabilities than merely calling a sizing or balloon type routine to change the size of an art form such as a circle. Ballooning a circle affects the entire configuration and flexibility is severly limited.

Figure 6:
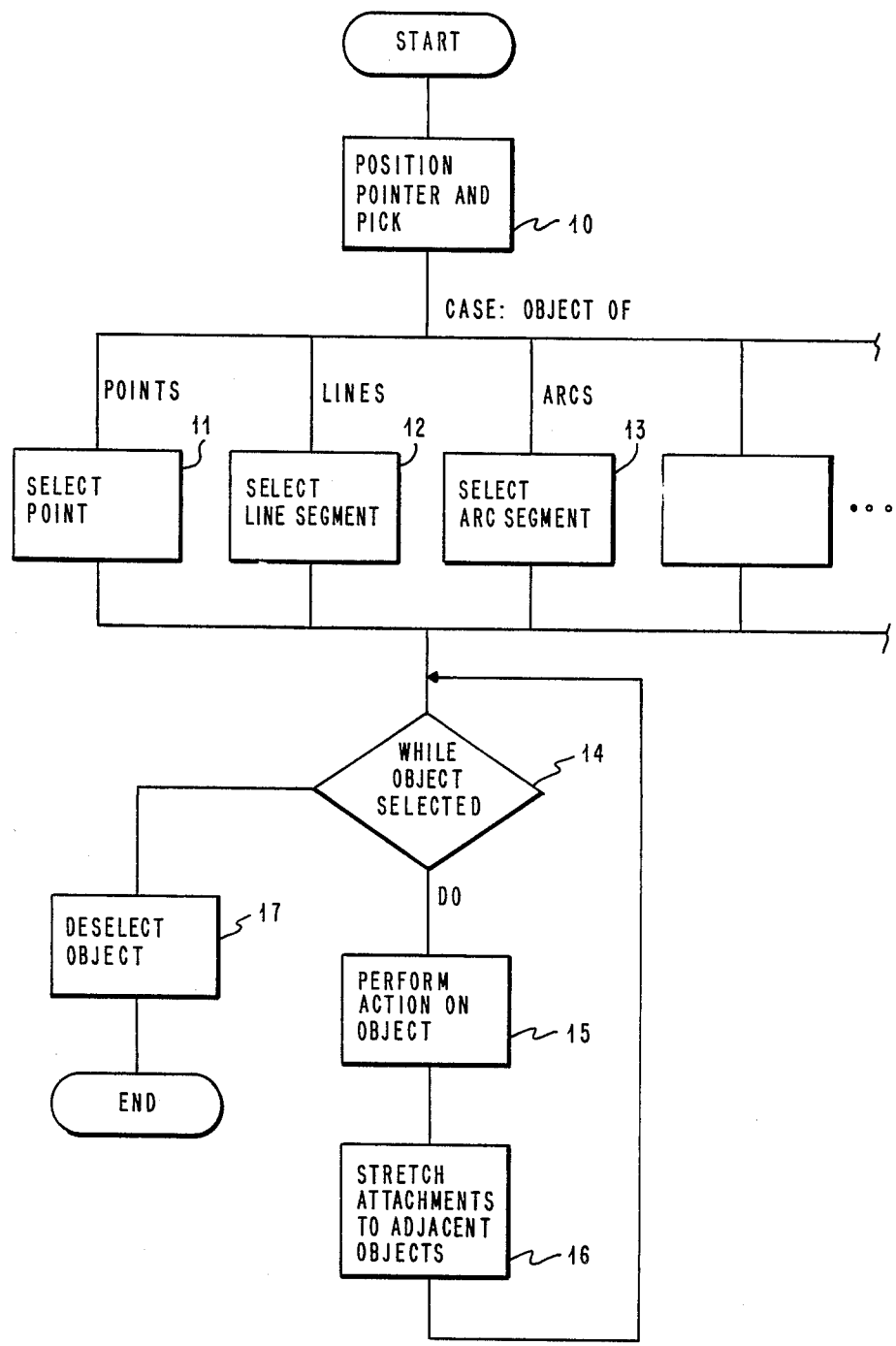
FIG. 6 is a flow chart illustrating operator actions and system functions required to alter art forms according to this invention.

Reference is next made to the flow chart of FIG. 6 which illustrates operator and system operations for causing alteration of an art form.

First, the operator fetches a pointer such as cursor 8 in FIG. 1. The operator then moves the pointer on the display screen by means of a locator device such as a mouse until the pointer is coincident with the object or portion to be selected. When the pointer is coincident with the object, the operator then presses a button or switch on the mouse to select the object. Selection of the object results in a call being built based on the definition of the object. The call is for a routine for altering the object. These operations are depicted by block 10.

The scope of the selection is determined by the definition of the object which is the portion of the art form to be altered. The object can be defined at the time of creation or prior to editing. Assume for purposes of the following that definition occurred during creation. If it were created as a set of points, or a broken line, only the point coincident with the pointer is selected as indicated by block 11. If created as a solid line, the coincident line segment is selected as indicated by block 12. If created as an arc, the arc segment is selected as indicated by block 13.

The next operator action is to continue to hold the button depressed as indicated by block 14 and move the locator device. As the locator device is moved, the selected portion or object is correspondingly moved under routine control as indicated by block 15. As the selected portion moves, its points of attachment to the non-selected portion are adjusted to obtain the appropriate shape such as a polygon, circle, elipse, etc., as indicated by block 16.

Movement and art form alteration can continue until the operator releases the button, at which time the selected portion or the object becomes unselected and ceases to follow locator/pointer movement, as indicated by block 17.

Set out below is an illustration of a routine or application useable by a processor in the installation for causing alteration of an art form based on operator input and actions. This routine is in program design language from which source and machine code are derivable.

```
ON POINTER SELECTION
  CALL OBJECT
  CASE OF OBJECT-TYPE
    CASE: 'POINT'
      CALL FIND-ATTACH (X1, Y1, X2, Y2)
      WHILE POINT IS SELECTED
        CALL FIND-POINT (XP, YP)
        CALL ERASE (X1, Y1, XP, YP)
        CALL UPDATE-POINT (XP, YP, INCR)
        CALL DRAW (X1, Y1, XP, YP)
        CALL DRAW (XP, YP, X2, Y2)
      ENDWHILE
    CASE: 'LINE'
      CALL FIND-ATTACH (X1, Y1, X2, Y2)
      CALL LINE-DIRECTION
      WHILE LINE IS SELECTED
        CASE OF LINE-DIRECTION
          CASE: 'VERTICAL'
            CALL ERASE (X1, Y1, X2, Y2)
            CALL UPDATE-LINE (X1, X2, HORIZ-INCR)
            CALL DRAW (X1, Y1, X2, Y2)
          CASE: 'HORIZONTAL'
            CALL ERASE (X1, Y1, X2, Y2)
            CALL UPDATE-LINE (Y1, Y2, VERT-INCR)
            CALL DRAW (X1, Y1, X2, Y2)
        ENDCASE
      ENDWHILE
    CASE: 'ARC'
      CALL FIND-ATTACH (X1, Y1, X2, Y2)
      CALL ARC-RADIUS
      WHILE ARC IS SELECTED
        CALL ERASE-ARC (X1, Y1, X2, Y2, R)
        CALL UPDATE-ARC (R, INCR)
        CALL DRAW-ARC (X1, Y1, X2, Y2, R)
      ENDWHILE
  ENDCASE
```

Figure 4:
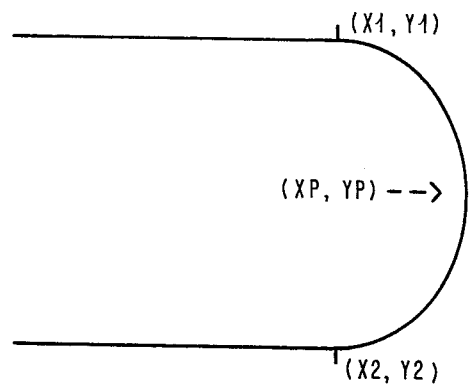
FIG. 4 illustrates two spaced parallel lines connected by an arc which is to be altered according to this invention.

When the button on the mouse is pressed, a routine is called (CALL OBJECT) to determine the object type. FIG. 4 illustrates examples of object types composed of "points", "lines", or "arcs". The object's type can be specified by the operator when the object is initially created and is typically stored in an array containing an element for each object. From a flexibility standpoint, the object type can be specified or respecified prior to art form editing.

In each case, the attachment points or outer extremities, joining the selected object to the remainder of the art form, are determined (CALL FIND-ATTACH). Such information is typically stored in the object array for each object. The attachment points are returned as a pair of Cartesian coordinates (X1, Y1 and X2, Y2).

As the button is held pressed, movement of the object is realized by (1) determining the current coordinates of the pointer/locator (XP, YP returned by CALL FIND-POINT), (2) erasing the selected portion (CALL ERASE), (3) determining the coordinates of the new location of the pointer/locator (CALL UP-DATE-POINT), (4) and displaying the selected portion based on the new coordinates (CALL DRAW and CALL DRAW-ARC).

The resulting new object shape is a function of the object's type definition.

The above routine will now be described with reference to the object types shown in FIG. 6.

For an object or portion of art form composed of points such as a broken straight line shown in FIG. 1, after determining the attachment points (X1, Y1, X2, Y2), the current object segment is erased. It is erased in two steps. One step is from the first attachment coordinate (X1, Y1) to the current locator coordinates (XP, YP), and a second from the current locator coordinates (XP, YP) to the second attachment coordinate (X2, Y2 and CALL ERASE). Then the new locator coordinates are determined (CALL UPDATE-POINT) and the portion is redrawn at its new location (CALL DRAW). The portion is erased and redrawn in two operations in order to simplify the ERASE and DRAW routines by confining them to straight line requirements. Other techniques are obviously possible.

Figure 3:
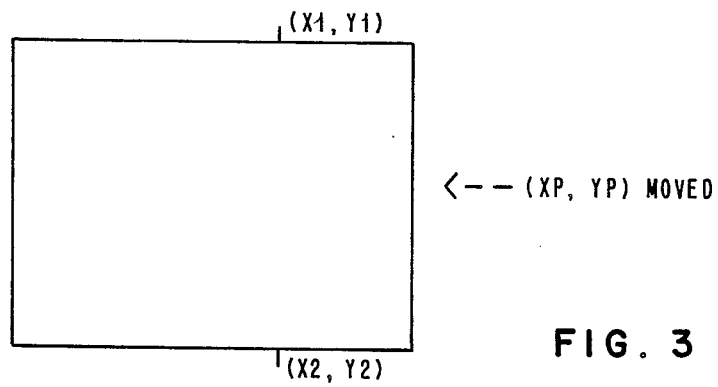
FIG. 3 illustrates a rectangle formed upon alteration of the selected side of the square shown in FIG. 1 and based on another definition of the side.

For an object composed of a solid straight line as illustrated in FIG. 3, after determining the attachment points (X1, Y1, X2, Y2), the direction of the line is determined as either horizontal or vertical (CALL LINE-DIRECTION). This information would typically be stored in the object array or could be determined by analysis of the coordinates. Appropriate routines are then performed to erase, update, and redraw the object portion, based on horizontal or vertical movement of the locator (CALL ERASE, CALL UPDATE-LINE, CALL DRAW). For purposes of clarity, only horizontal or vertical lines are considered here. As is obvious though, lines at any angle could be supported.

Figure 5:
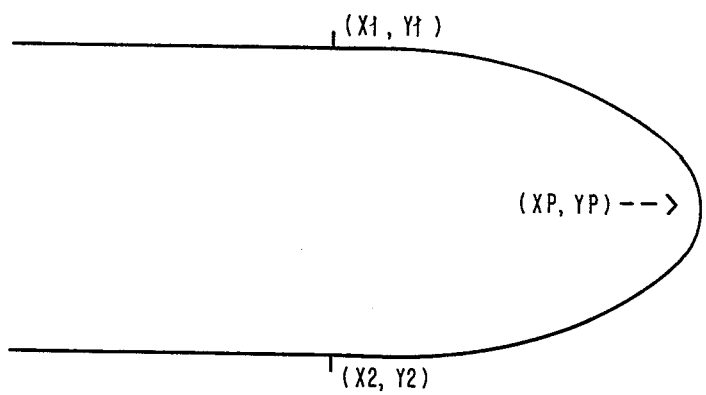
FIG. 5 illustrates the arc of FIG. 4 having been altered based on one definition of the arc.

For an object composed of an arc (broken curved line) as shown in FIG. 4, after determining the attachment points (X1, Y1, X2, Y2), the arc radius is determined (CALL ARC-RADIUS). This information would typically be maintained in the object array. The current arc portion is then erased, its location is updated, and the arc is redrawn (CALL ERASE, CALL UPDATE-ARC, CALL DRAW-ARC). Here, the DRAW-ARC ROUTINE causes simple arcs to be drawn as a function of a single radius. Thus, FIG. 5 is produced using a simple eliptical routine. More complicated arc routines are obviously implementable.

The hyphen appearing in the above design language represents underscore characters.

In each above case, editing continues while the button is held pressed and ceases when it is released.

In summary, a unique method of, and system for, editing the configuration of a graphic art form are provided in order to eliminate excessive manipulation and attention, improve throughput, expand capabilities, and facilitate rapid change. A number of art form altering routines is stored. The routines will correspond to permitted definitions. Based on a definition of a portion of an art form to be altered, an appropriate routine is called from storage. The routine is then utilized under device control to attain a desired alteration.

While the invention has been particularly shown and described with reference to a preferred embodiment, it will be understood by those skilled in the art that various changes in form and detail may be made without departing from the spirit and scope of the invention.

We claim:

1. A method of altering the configuration of an art form displayed on a display device of a computing installation, said method comprising:
   (a) defining the character of a to-be-altered portion of said art form according to a type of alteration to be performed;
   (b) selecting said portion to be altered;
   (c) said computing installation calling a routine responsive to selecting said portion based on said defining of said portion;
   (d) said routine thereby altering the configuration of said portion in a manner corresponding to said definition in response to a user input.

2. A method according to claim 1 wherein said defining a portion includes defining the extremities of said portion.

3. A method according to claim 2 wherein said defining said portion according to a type of alteration to be performed includes defining said portion according to whether said portion is to be translated or extended.

4. A method according to claim 3 where said defining said portion according to a type of alteration to be performed includes defining a type of said portion.

5. A method according to claim 4 wherein said altering the configuration of said portion includes selecting said portion.

6. A method according to claim 5 wherein said selecting said portion includes determining a direction of translation or extension of said portion.

7. A method according to claim 5 wherein said selecting said portion includes selecting said portion with a cursor.

8. A method according to claim 7 wherein said altering the configuration of said portion is performed dynamically upon movement of said cursor.

9. A method according to claim 5 wherein said selecting said portion includes selecting a point on said portion.

10. A computing installation for altering the configuration of an art form displayed on a display device included in said installation, said system comprising:
    (a) means for defining the character of a to-be-altered portion of said art form according to a type of alteration to be performed;
    (b) means responsive to a user selection of said portion for calling a routine based on said defining of said portion by said defining means; and
    (c) means for using said routine for altering the configuration of said portion in a manner corresponding to said definition in response to a user input.

* * * * *